United States Patent [19]
Kwon et al.

[11] Patent Number: 5,908,965
[45] Date of Patent: Jun. 1, 1999

[54] BUILD-UP SUPPRESSANT IN THE POLYMERIZATION REACTOR AND PROCESS FOR THE PREPARATION THEREOF

[75] Inventors: Oh-Sig Kwon; Young Wook Kim, both of Taejeon; Il Won Kim, Kyungki-do; Young Gyu Kim; Ho Yeon Won, both of Taejeon, all of Rep. of Korea

[73] Assignee: Hanwha Chemical Corporation, Seoul, Rep. of Korea

[21] Appl. No.: 08/560,978

[22] Filed: Nov. 20, 1995

[30] Foreign Application Priority Data

Nov. 21, 1994 [KR] Rep. of Korea .................. 94-30663

[51] Int. Cl.$^6$ .................................................. C07C 39/12
[52] U.S. Cl. ................................................ 568/720
[58] Field of Search .................. 568/720, 717, 568/718

[56] References Cited

U.S. PATENT DOCUMENTS 4,719,089   1/1988   Gardner .

OTHER PUBLICATIONS

Derosa et al., Macromolecules, 1985, 18, 2280–2281, 1885.

Derosa et al., Macromolecules, 1985, 18, 2277–2280, 1985.

Derosa et al., Polym. Prepr., 1983, 24(2), 175–177, 1983

Imoto et al., Makromol. Chem., 1968, 113, 117–130, 1968

*Primary Examiner*—Michael L. Shippen
*Attorney, Agent, or Firm*—Birch, Stewart, Kolasch & Birch, LLP

[57] ABSTRACT

The present invention relates to a build-up suppressant used for suppressing the formation of a build-up during the polymerization reaction and to a process for the preparation thereof. The present invention also relates to a method for suppressing the build-up formation by forming a coating film on the reactor internal surface with the build-up suppressant and to a method for polymerization of vinyl halide or vinyl monomers having aromatic group(s) in the above reactor internally coated.

14 Claims, No Drawings

BUILD-UP SUPPRESSANT IN THE POLYMERIZATION REACTOR AND PROCESS FOR THE PREPARATION THEREOF

BACKGROUND OF INVENTION

1. Field of Invention

The present invention relates to a build-up suppressant having the following formula (I) used for suppressing the formation of a build-up during the polymerization reaction of vinyl halide or vinyl monomers having aromatic group(s) and causes many serious problems:

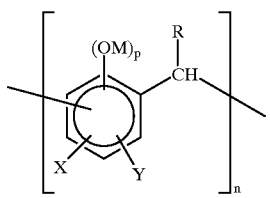

(I)

in which, p denotes 1 or 2,

X and Y independently of one another represent hydrogen, $C_1$–$C_4$ alkyl or $C_1$–$C_4$ alkoxy, M represents hydrogen, or alkali metal or alkaline earth metal ion, R represents hydrogen or $C_1$–$C_3$ alkyl, and the number average molecular weight ($M_n$) of the above build-up suppressant is 1000 or more.

The present invention also relates to a process for preparing the build-up suppressant of the above formula (I), a method for suppressing the build-up formation by coating the internal surface of a polymerization reactor with the build-up suppressant and to a method for polymerization of vinyl halide or vinyl monomers having aromatic group(s) in the above reactor internally coated.

2. Background Art

When vinyl chloride is homo- or copolymerized in aqueous suspension in a reactor, it has been well known that a problem arises in that metallic surface inside the polymerization reactor becomes coated with tenaciously adhering polymeric material known as build-up. The formation of tenaciously adhering build-up is undesirable from the view point of achieving efficient heat transfer and of lowering the stability of the processes. In addition, the build-up is causative of impurities or fish eye formation and thus lowers the polymer quality.

Hitherto, in order to solve such problems as mentioned above, the polymerization reactor has been cleaned between each polymerization cycle wherein the deposited materials are removed by hand cleaning or by pressurized water-washing. However, these methods are wasteful because they may induce an increment of cost and loss of productivity.

Therefore, many products having build-up suppressant activity have been studied from the view point of inhibiting the formation of the build-up itself (see Japanese Laid-open Patent Publication cation No. 56-78388 and European Patent Publication No. 52,421).

The Japanese Laid-open Patent Publication No. 56-78388 discloses a product having build-up suppressant activity produced by the condensation of aromatic aldehyde and phenol. But, since this build-up suppressant has a high solubility in monomer phase or medium phase, it may be solubilized into the reaction solution during polymerization and as a result, not only does not satisfactorily perform its function but also may act as an, impurity. Further, lowering of the build-up suppressant activity can occur in case where alkaline or aqueous mediums, or aqueous initiators are used during the reaction. Even though the cross-link was introduced therein, the build-up suppressant has not been improved in its activity. Moreover, it may cause a problem of environmental contamination due to an increment of the COD (chemical oxygen demand) in discharged waste water, and it may also worsen the working conditions because organic solvents such as methanol, ethanol, dimethylformamide (DMF) or ethyl acetate are used for preparing the build-up suppressant coating solution.

On the other hand, the European Patent Publication No. 52,421 discloses an aqueous product having good build-up suppressant activity formable by the condensation of 1-naphthol and formaldehyde, and a process for the preparation thereof. However, since this condensate is a low polymer such as cyclic trimer or tetramer, effect therefrom becomes unsatisfactory as may be solubilized into the reaction medium during polymerization reaction.

Accordingly, the present inventors have been extensively studied to develop a new build-up suppressant having much more effective suppressing activity than the earlier ones. The present inventors have focussed their attention on the chemical structure and molecular weight of the build-up suppressant, and consequently found an astonishing fact that such purpose can be satisfied by applying the condensate of formula (I) as a build-up suppressant to the reactor internal surfaces in the polymerization reaction of vinyl monomer, and thus completed the present invention.

Therefore, it is an object of the present invention to provide a novel build-up suppressant having the above formula (I) and a process for preparing the same.

It is another object of the present invention to provide a method for suppressing the build-up formation by coating the reactor internal surface with the build-up suppressant and a method for polymerization of vinyl halide or vinyl monomers having aromatic group(s) in the above reactor internally coated.

The foregoing has outlined some of the more pertinent objects of the present invention. These objects should be construed to be merely illustrative of some of the more pertinent features and applications of the invention. Many other beneficial results can be obtained by applying the disclosed invention in a different manner or modifying the invention within the scope of the disclosure. Accordingly, other objects and a more thorough understanding of the invention may be had by referring to the disclosure of invention, in addition to the scope of the invention defined by the claims.

DISCLOSURE OF INVENTION

In one aspect, the present invention relates to a build-up suppressant represented by the following formula (I).

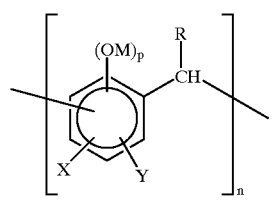

(I)

in which, p denotes 1 or 2,

X and Y independently of one another represent hydrogen, $C_1$–$C_4$ alkyl or $C_1$–$C_4$ alkoxy, M represents hydrogen, or alkali metal or alkaline earth metal ion, R represents hydrogen or $C_1$–$C_3$ alkyl, and the number average molecular weight ($M_n$) of the above build-up suppresant is 1000 or more.

The number average molecular weight of the condensate of formula (I) according to the present invention is 1000 or more as aforementioned, especially the condensate contains low polymers having a molecular weight of less than 1000 in an amount of less than 30%. In addition, the molar ratio of M representing hydrogen versus metal ion in the condensate of formula (I) is in a range of 0.9–0.6:0.1–0.4 when the total value is fixed to 1.0.

Further, the solubility in aqueous medium of the build-up suppressant according to the present invention has been increased not only because it is water-soluble but also because the cross-links are absolutely excluded. Due to the high solubility, the build-up suppressant coating solution of the present invention can be used as an aqueous solution and thus hardly contaminates the environment in comparison with the earlier suppressant and represents no toxicity to the human body. Moreover, since the molecular weight of the present build-up suppressant has been increased the force of suppressing the build-up formation has greatly been improved without any problems.

The build-up suppressant having the formula (I) can be prepared by subjecting a compound of formula (II) and an aldehyde of formula (III) to a polycondensation reaction in the presence of an acidic or basic catalyst to obtain a precursor of formula (I') or (I") and continuously adjusting the pH of the precursor to a range of 9 to 13 with an acidic or alkaline solution as shown in the following reaction scheme 1:

what long reaction time to obtain the condensation polymer stoichiometrically and also a condensation polymer having low molecular weight is produced. On the other hand, under the presence of an acidic catalyst the time required for the reaction is shortened and a condensation polymer having relatively high molecular weight is stoichiometrically obtained. Thus, it is preferable to carry out the polycondensation reaction in the presence of an acidic catalyst.

As the acidic catalyst for the above polycondensation reaction, hydrochloric acid, sulfuric acid, nitric acid, phosphoric acid or acetic acid can be preferably mentioned, and as the basic catalyst, hydroxide of alkali metal or alkaline earth metal, preferably sodium hydroxide or potassium hydroxide can be mentioned. In case of using the acidic catalyst, the catalyst can be used in a range of 0.2 to 3 times molar amount, preferably 0.5 to 2 times molar amount with respect to the starting material of formula (II) in a solution polymerization and also used in a range of 0.01 to 0.2 time molar amount, preferably 0.01 to 0.1 time molar amount with respect to the same starting material in a bulk polymerization. On the other hand, the basic catalyst can be used in a range of 2 to 6 times molar amount, preferably 3 to 5 times molar amount with respect to the starting material (II). By using the catalyst in a ratio as mentioned above, it becomes possible to obtain a pure precursor which has large molecular weight as well as prominent build-up suppressant activity and does not comprise any network structures (qualitatively determined by examining the solubility characteristics of the precursor (I') or (II") on alkaline solution and acidic solution) formed due to a cross-link.

The precursors of formula (I') or (I") alone cannot show the desirable build-up suppressant activity, therefore they should be activated into a form of the build-up suppressant of formula (I) according to the present invention. After isolating first the precursor from the reaction solution, in case where the polycondensation reaction is carried out in Reaction Scheme 1

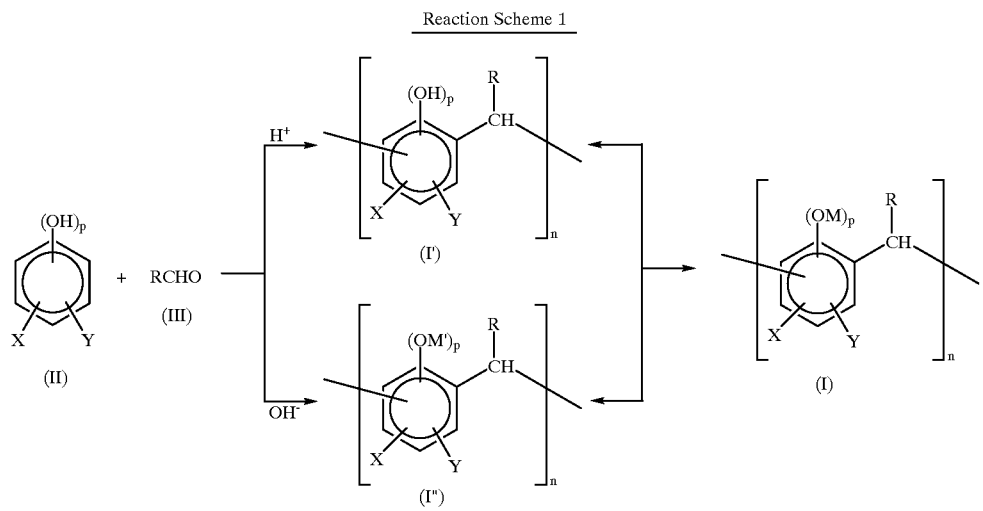

in which, p, X, Y, M and R are defined as previously described; and

M' represents alkali metal or alkaline earth metal ion,

The polycondensation reaction of the compound (II) with the compound (III) can be conveniently carried out in the presence of an acidic or basic catalyst at the reaction temperature between 60 and 150° C., preferably 80 and 120° C. in the same manner as solution- or bulk-polymerization. Under the presence of a basic catalyst, there required somethe presence of an acidic catalyst, the isolated precursor should be treated with an alkaline solution so as to change a specific portion of the M from hydrogen to metal ion since all M in the precursor exist as hydrogen atoms. On the other hand, when a basic catalyst is used, the precursor should be treated with an acidic solution so as to accomplish the same effect as described for the acidic catalyst. As the alkaline and acidic materials used herein, the same compounds as defined above for the acidic and basic catalysts can be used.

According to the present invention, it is preferable to adjust the pH of the build-up suppressant solution to a range of 9 to 13. In a case of less than pH 9, effective suppression cannot be achieved since the solubility of the build-up suppressant is lowered. In a case of more than pH 13, even though the solubility of the build-up suppressant is increased, it can not satisfactorily perform its function because the build-up suppressant applied to the reactor internal surface may be solubilized into the water solvent during polymerization reaction. Particularly, the coating solution of the build-up suppressant according to the present invention exhibits more desirable coating characteristics on the metalic surface at a pH range of 11 to 12.

Among the compound of formula (II) used as a starting material in the above reaction scheme 1, the preferred compounds include those wherein the 2- or 4- position of phenol ring is substituted with an alkoxy group in case p denotes 1, or one of the 2-, 4- and 6- positions of the phenol ring is substituted with an alkyl or alkoxy group in case p denotes 2. Particularly preferred compounds of formula (II) include 4-methoxyphenol, 4-ethoxyphenol, 2-methoxyphenol, 2-ethoxyphenol, 2-methylresorcinol, 4-methylresorcinol and the like.

The preferred compounds among the reactants of formula (III) include formaldehyde or acetaldehyde. The reactant is used in a range of 0.8 to 1.2 time molar amount, preferably 0.95 to 1.05 time molar amount, with respect to the starting compound of formula (II).

The present build-up suppressant of formula (I) prepared by way of the reaction described above was identified by NMR and IR to have a novolak-type molecular structure.

The present invention also relates to a method for suppressing the build-up formation by coating an internal surface of the polymerization reactor with a build-up suppressant having the above formula (I) and to a method for polymerization carried out in the above reactor internally coated. More specifically, the present invention relates to a method for polymerization of vinyl halide or vinyl monomers having aromatic group(s) in aqueous suspension characterized in that the polymerization is carried out in a polymerization reactor having a coating film on its internal surface so as to markedly suppress the deposition of the build-up. The coating film therein is formed by applying an alkaline aqueous solution comprising the build-up suppressant of the present invention to the reactor internal surface.

The build-up suppressant solution of the present invention can be prepared by adjusting the concentration thereof to a range of 0.05 to 30% by weight, preferably 0.5 to 10% by weight with respect to solid components, simultaneously with adjusting to an adequate pH range. The suppressant solution is applied to the internal surface of a polymerization reactor and the internally coated reactor is used for the polymerization of monomers including vinyl chloride. The suppressant solution can preferably be prepared as an aqueous solution, however a solution dissolved in an organic solvent such as methanol, ethanol, ethyl acetate or acetone, etc. also shows no big difference in effect when compared with the aqueous solution.

The build-up suppressant according to the present invention can be used alone or in combination with any supplementary components, for example one or more selected from protective colloids or nonionic anti-foaming agents. As the protective colloid, polyvinyl alcohol, cellulose ether, polyvinyl pyrrolidine, vinyl acetate-maleic anhydride copolymer, starch or gelatin can be mentioned. The protective colloid increases the adhesion force of the build-up suppressant on the metalic surface. As the nonionic anti-foaming agent, polyethylene glycol, arabia gum, ghatti gum or hydroxyalkylated gum can be mentioned and they are used for suppressing the formation of bubbles in the build-up suppressant solution. These supplementary components are used in an amount of less than 20% by weight, preferably 1 to 10% by weight with respect to the build-up suppressant.

There is no restriction on the method for coating the build-up suppressant solution to the internal surface of a polymerization reactor, but the conventional spray method is preferably used. The solution is applied with an amount of 0.1 to 5 g per $m^2$ of the reactor internal surface. After applying, the temperature of the reactor is raised to a range of 40 to 100° C. to evaporate water from the coating solution, and then the solution is dried and washed. This washing is required because the alkaline coating solution is changed into an insoluble solution by way of the hydrogenation reaction and thus the coating characteristics can be improved. If necessary, further drying can be carried out to obtain more excellent suppressant activity and coating characteristics.

Several effects as mentioned hereinafter can be accomplished by applying the present build-up suppressant to the internal surface of the polymerization reactor in order to form a coating film. That is, the quality of the PVC product prepared by the polymerization according to the present invention is greatly improved due to a reduction of the number of fish eye; continuous polymerization reaction is practicable without removing the deposited build-up between cycles; and expense-saving effect as well as high productivity are accomplished since the equipment and manpower for cleaning the reactor are not required any more. Moreover, not using an organic solvent at the step of preparing the build-up suppressant coating solution is possible, therefore, several problems resulting from the organic solvent such as environmental contamination, worsening of working condition and toxicity can be solved.

The present invention will be more specifically explained in the following examples. However, it should be understood that the following examples are intended to illustrate the present invention and not to limit the scope of the present invention in any manner. Unless otherwise stated all parts and percentages therein are by weight. $M_n$ means number average molecular weight and $M_w$ means weight average molecular weight, respectively.

EXAMPLES 1

To a 10 L 5-neck glass reactor equipped with a reflux condenser, thermometer, dropping funnel and stirrer were introduced 2.48 kg(20 mole) of paramethoxyphenol, 5 L of deionized water and 2.03 L (20 mole with respecttoydrochloric acid) of35% aqueous hydrochloric acid solution, and the mixture was stirred while raising the temperature gradually. When the temperature reached 80 ° C., 1.62 kg(20 mole) of 37% aqueous formaldehyde solution was slowly added dropwise through the dropping funnel over 3 hours and then the reaction was carried out for further 2 hours in order to complete the reaction under reflux condensing. While lowering the temperature gradually, the reactants were vigorously stirred and then filtered to obtain 2.72 kg of the precursor ($M_n$:1691, $M_w$:5943) as a solid stoichiometrically.

1 kg of the precursor prepared above was dissolved in 3 L of aqueous solution in which 76 g of sodium hydroxide was dissolved. Water was further added to said solution to prepare the build-up suppressant of the present invention in a concentration of 3%. with respect to solid components. This solution can be used by itself or more diluted with water, however the final pH of the solution should be adjusted to 11 to 12 irrelevant to the content of the build-up suppressant.

EXAMPLE 2

A precursor ($M_n$:1404, $K_w$:6219) having a pale green color was obtained stoichiometrically in the same procedure as Example 1 except that 0.2 time molar amount with respect to paramethoxyphenol of hydrochloric acid as an acidic catalyst was used and the reaction was carried out over 4 hours under reflux condensing after adding the formaldehyde dropwise, and then a build-up suppressant of the present invention was prepared therefrom.

EXAMPLE 3

A precursor ($M_n$:1770, $M_w$:19391) having a dark green color was obtained stoichiometrically in the same procedure as Example 1 except that 3 times molar amount with respect to paramethoxyphenol of hydrochloric acid as an acidic catalyst was used, and then a build-up suppressant of the present invention was prepared therefrom. Since unsoluble materials were produced during the preparation of said build-up suppressant, they were removed by filtration from the solution.

EXAMPLE 4

1.632 kg(Yield : 60%) of a precursor ($M_n$:1350, $M_w$:1730) as a brown solid was prepared according to the same procedure as Example 1 except that 0.6 kg of sodium hydroxide as a basic catalyst was used and the produced precursor was extracted from aqueous hydrochloric acid. Then, a 3% build-up suppressant solution of the present invention in a pH range of 11 to 12 was obtained by adding sodium hydroxide solution to 1 kg of said precursor.

EXAMPLE 5

A precursor ($M_n$:1839, $M_w$:7110) was obtained stoichiometrically in the same procedure as Example 1 except that paraethoxyphenol was used instead of paranethoxyphenol, and then a build-up suppressant of the present invention was prepared therefrom.

EXAMPLE 6

A precursor ($M_n$:1120, $M_w$:2350) was obtained stoichiometrically in the same procedure as Example I except that 2-ethoxyphenol was used instead of paramethoxyphenol, and then a build-up suppressant of the present invention was prepared therefrom.

EXAMPLE 7

A precursor ($M_n$:1230, $M_w$:7320) was obtained stoichiometrically in the same procedure as Example 1 except that 2-methylresorcinol was used instead of paramethoxyphenol, and then a build-up suppressant of the present invention was prepared therefrom.

EXAMPLE 8

4 kg(32.3 mole) or paramethoxyphenol, 2.62 kg (32.3 mole) of 37% aqueous formaldehyde solution and 76 g of concentrated sulfuric acid were introduced into a 10 L stainless steel reactor equipped with a reflux condenser and then said reactor was sealed. The temperature of the reaction mixture was raised to 95° C. and bulk polymerization reaction was carried out over 8 hours to obtain 4.39 kg of a precursor($M_n$:1371, $M_w$:31720). Then, a build-up suppressant of the present invention was prepared therefrom.

EXAMPLES 9 to 16

The internal surfaces, made of stainless steel, of 40 L polymerization reactors were respectively coated with 10 ml of 3% build-up suppressant solution each of which were prepared in Examples 1 to 8. After coating, the reactor was heated to 70° C. to dry the coating solution, washed with 200 ml of water and then dried again at the same temperature.

100 parts of vinyl chloride monomer (VCM), 160 parts of water, 1150 ppm (with respect to VCM) of hydrolyzed polyvinyl acetate and 600 ppm (with respect to VCM) of t-butyl peroxineodecanoate/di-3,5,5-trimethyl hexanoyl phenoxide (1:1, w/w) were respectively introduced into the internally coated reactors prepared above and then polymerization reactions were carried out at 58° C. and 8.5 atm. When the reaction pressure was more lowered to an amount of 0.5 kg/cm$^2$ than the normal pressure (which indicates about 70% conversion), the unreacted VCM was recovered to stop the polymerization reaction. The build-up deposits produced in each reactors were recovered and weighed. The results are represented in Table 1.

EXAMPLES 17 to 24

100 parts of VCM, 28 parts of vinyl acetate, 160 parts of deionized water, 700 ppm of methyl cellulose (shineustu MC-90), 240 ppm of polyvinyl pyrrolidone and 730 ppm of sorbitan monostearate as suspending agents, and 370 ppm of 2,2'-azobisisobutyronitrile as an initiator were introduced into a polymerization reactor and then polymerization reaction was carried out in the same manner as Examples 9 to 16 except that the reaction temperature was 60° C. The results obtained from the weighing of build-up deposits in the reactor are represented in Table 2.

COMPARATIVE EXAMPLE 1

Polymerization reaction was carried out in the same procedure as Examples 9 to 16 except that the internal surface of reactor was not coated with the build-up suppressant at all. The result is shown in Table 1.

COMPARATIVE EXAMPLE 2

Polymerization reaction was carried out in the same procedure as Examples 17 to 24 except that the reactor internal surface was not coated with the build-up suppressant at all. After completion of the reaction, the internal surface of the reactor was observed and it can be recognized that heavy build-up was tenaciously deposited to the internal surface. The results obtained from the weighing of the build-up deposits is represented in Table 2.

TABLE 1

|  | EX. | | | | | | | | COM. EX. |
| --- | --- | --- | --- | --- | --- | --- | --- | --- | --- |
|  | 9 | 10 | 11 | 12 | 13 | 14 | 15 | 16 | 1 |
| Build-up (g) | 0 | 0 | 0 | 0 | 0 | 0 | 0 | 0 | 185 |
| Fish eye (Nos./100 cm$^2$) | 2 | 4 | 3 | 11 | 4 | 3 | 7 | 3 | 17 |

TABLE 2

| | EX. | | | | | | | | COM. EX. |
|---|---|---|---|---|---|---|---|---|---|
| | 17 | 18 | 19 | 20 | 21 | 22 | 23 | 24 | 2 |
| Build-up (g) | 0 | 0 | 0 | 0 | 0 | 0 | 0 | 0 | 635 |

EXAMPLE 25

To a 100 L metalic reactor equipped with a reflux condenser, dropping funnel and stirrer were introduced 25 kg of paramethoxyphenol, 50 L of deionized water and 20.5 L (equimolar amount to paramethoxyphenol with respect to hydrochloric acid) of 35% aqueous hydrochloric acid solution, and the whole mixture was stirred while raising the reaction temperature gradually. When the temperature reached 80° C., equimolar amount to the paramethoxyphenol of 37% aqueous formaldehyde solution was slowly added in an uniform rate through the dropping funnel over 3 hours. The reaction solution was vigorously stirred for 3 hours and stirred again for 3 hours while cooling. The produced solid was isolated from the aqueous solution by centrifugation and dried over a hours in a drier of 80° C. to obtain the precursor ($M_n$:1670, $M_w$:6013) as a solid stoichiometrically.

In the same procedure as Example 1, 10 kg of the precursor prepared above was dissolved in an aqueous sodium hydroxide solution to have the pH 11 to 12. By adjusting a content of the suppressant, the build-up suppressant solution having a concentration of 34 was obtained.

EXAMPLE 26

The internal surface of a 82 m³ polymerization reactor was spray coated with 3 L of the build-up suppressant prepared in Example 25. After coating, the reactor was heated to 70° C. to dry the coating solution, washed with 200 L of water and then dried again at the same temperature.

28,286 kg of vinyl chloride monomer (VCM), 38,200 kg of deionized water, 0.5 kg of 2,2'-azobis-2,4-dimethyl valeronitrile (ABVN) and 3.7 kg of t-butyl peroxineodecanoate as initiators, 5.7 kg of polyvinyl alcohol compound K-420 (manufactured by Nippon Gosei Co.) as a suspending agent were introduced into the internally coated reactors prepared above and then polymerization reaction was carried out in the same procedure as Examples 9 to 16. Inspection of the reactor internal surface showed that it was completely free from any build-up. The specific results are shown in Table 3.

EXAMPLE 27

The internal surface of a 20m³ polymerization reactor was spray coated with 2 L of the 3% build-up suppressant prepared in Example 25. After coating, the reactor was heated to 70° C. to dry the coating solution, washed with 100 L of water and then dried again at the same temperature.

4,840 kg of vinyl chloride monomer -(VCM), 1,060 kg of vinyl acetate monomer, 11,000 kg of deionized water, and 3.42 kg of methyl cellulose MC-90 and 4.72 kg of polyvinyl alcohol as suspending agents were introduced into the internally coated reactors prepared above and then polymerization reaction was carried out according to the same procedure as Examples 9 to 16. Inspection of the reactor internal surface showed that it was completely free from any build-up in the same manner as Example 26.

COMPARATIVE EXAMPLE 3

10 kg of pyrogallol, 5.5 kg of benzaldehyde, 19 kg of phosphoric acid and 50 L of deionized water were introduced into a 100 L reactor equipped with a stirrer and then polymerization was carried out over 22 hours at 98° C. Thus obtained was dehydrated and dried. A mixture consisting of 2.8 L of dimethyl formamide, 500 ml of acetone and 140 L of deionized water was added thereto to obtain the known build-up suppressant. 10 L of said solution was applied to a reactor according to the same procedure as Example 26 and then polymerization reaction of VCM was carried out. The results are shown in Table 3.

TABLE 3

| Polymerization | Build-up amount | | |
|---|---|---|---|
| Cycles | EX. 26 | COM. EX. 3 | Note |
| 1 | none | none | qualitative |
| 5 | none | none | inspection |
| 10 | none | none | |
| 20 | none | observed | |
| 37 | 150 g | 1130 g | measured after cleaning |

*Note: The above listed results are to summarize the results measured after pressure-washing the reactor with water in each polymerization cycles.

As can be seen in the above Tables 1, 2 and 3, in case the build-up suppressant according to the present invention is used, great improvement in suppressing the formation of build-up is shown in comparison with the case of said build-up suppressant being not used. In addition, the build-up suppressant of the present invention shows much superior effect in contrast to the earlier build-up suppressant (Comparative Example 3), particularly the difference becomes more distinct as the number of polymerization cycles increases.

What is claimed is:

1. A process for preparing a build-up suppressant having the following formula (I) characterized in that a compound having the following formula (II) is subjected with an aldehyde having the following formula (III) to a polycondensation reaction in the presence of an acidic or basic catalyst to obtain a precursor of formula (I') or (I") and continuously adjusting the pH of the precursor to a range of 9 to 13 with an acidic or alkaline solution

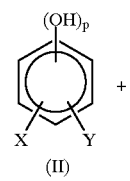

(II)

-continued

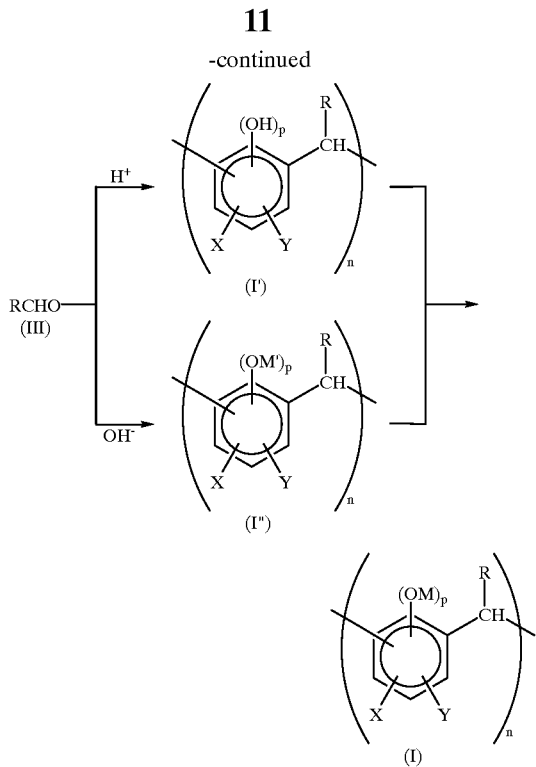

in which, p denotes 1 or 2,

X and Y independently of one another represent hydrogen, $C_1$–$C_4$ alkyl or $C_1$–$C_4$ alkoxy, M represents hydrogen, or alkali metal or alkaline earth metal ion, wherein the molar ratio of M representing hydrogen versus metal ion is in a range of 0.9–0.6 0.1–0.4 when the total value is fixed to 1.0, R represents hydrogen or $C_1$–$C_3$ alkyl, n represents a number of polymerization unit to form the build-up suppressant (I) having the number average molecular weight ($M_n$) of 1000 or more, and M' represents alkali metal or alkaline earth metal ion.

2. The process of claim 1, characterized in that the compound of formula (II) is selected from the compounds wherein the 2- or 4- position of the phenol ring is substituted with an alkoxy group in case p denotes 1, or one of the. 2-, 4- and 6- positions of the phenol ring is substituted with an alkyl or alkoxy group in case p denotes 2.

3. The process of claim 2, wherein the compound of formula (II) is selected from the group consisting of 4-methoxyphenol, 4-ethoxyphenol, 2-methoxyphenol, 2-ethoxyphenol, 2-methylresorcinol and 4-methylresorcinol.

4. The process of claim 3, wherein the aldehyde of formula (III) is formaldehyde or acetaldehyde.

5. The process of claim 1, wherein the aldehyde of formula (III) is used in a range of 0.8 to 1.2 time molar amount with respect to the compound of formula (II).

6. The process of claim 1, wherein the aldehyde of formula (III) is formaldehyde or acetaldehyde.

7. The process of claim 1, wherein the acidic catalyst is used in a range of 0.2 to 3 times molar amount in a solution polymerization and used in a range of 0.01 to 0.2 time molar amount in a bulk polymerization with respect to the compound of formula (II).

8. The process of claim 7, wherein the acidic catalyst is used in a range of 0.5 to 2 times molar amount in a solution polymerization and used in a range of 0.01 to 0.1 time molar amount in a bulk polymerization with respect to the compound of formula (II).

9. The process of claim 7, wherein the acidic catalyst is one or more selected from the group consisting of hydrochloric acid, sulfuric acid, nitric acid, phosphoric acid and acetic acid.

10. The process of claim 1, wherein the acidic catalyst is one or more selected from the group consisting of hydrochloric acid, sulfuric acid, nitric acid, phosphoric acid and acetic acid.

11. The process of claim 1, wherein the basic catalyst is used in a range of 2 to 6 times molar amount with respect to the compound of formula (II).

12. The process of claim 11, wherein the basic catalyst is used in a range of 3 to 5 times molar amount with respect to the compound of formula (II).

13. The process of claim 11, wherein the basic catalyst is one or more selected from hydroxide or alkali metal or alkaline earth metal.

14. The process of claim 1, wherein the basic catalyst is one or more selected from hydroxide of alkali metal or alkaline earth metal.

* * * * *